United States Patent
Samii et al.

(10) Patent No.: US 10,459,436 B2
(45) Date of Patent: Oct. 29, 2019

(54) ASYMMETRIC SYSTEM ARCHITECTURE FOR FAIL-OPERATIONAL FUNCTIONS WITH LIMITED AVAILABILITY REQUIREMENTS

(71) Applicant: GM Global Technology Operations LLC, Detroit, MI (US)

(72) Inventors: Soheil Samii, Royal Oak, MI (US); David A. Bodenmiller, Milford, MI (US); Massimo Osella, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 154 days.

(21) Appl. No.: 15/611,371

(22) Filed: Jun. 1, 2017

(65) Prior Publication Data
US 2018/0348754 A1     Dec. 6, 2018

(51) Int. Cl.
*G05B 23/02* (2006.01)
*G05D 1/00* (2006.01)

(52) U.S. Cl.
CPC ....... *G05B 23/0286* (2013.01); *G05D 1/0077* (2013.01); *G05B 2219/2637* (2013.01)

(58) Field of Classification Search
CPC .............. G05D 1/0061; G05B 23/0286; G07C 5/0808; G07C 5/0816
See application file for complete search history.

(56) References Cited

U.S. PATENT DOCUMENTS

| | | | |
|---|---|---|---|
| 8,340,793 B2 | 12/2012 | Kamenetz et al. | |
| 9,195,232 B1 | 11/2015 | Egnor et al. | |
| 9,563,523 B2 | 2/2017 | Fuhrman et al. | |
| 2006/0015231 A1* | 1/2006 | Yoshimura | B60K 6/46 701/48 |
| 2011/0241862 A1* | 10/2011 | Debouk | B60W 50/038 340/439 |
| 2014/0277608 A1* | 9/2014 | Debouk | G05B 9/03 700/79 |
| 2016/0306720 A1 | 10/2016 | Fuhrman et al. | |

* cited by examiner

*Primary Examiner* — Aaron L Troost

(57) ABSTRACT

A vehicle system controller having an asymmetric system architecture and a method of operating the vehicle system controller is provided. The vehicle system controller includes a primary controller and a secondary controller in communications with the vehicle systems. Each of the controllers include a memory unit containing software application and a processor for executing the software to generate commands for the vehicle systems. The memory unit of the secondary controller contains only a subset of the total software applications contained in the memory unit of the primary controller. The subset of software applications is only for the operation of pre-identified features of the vehicle systems. The vehicle systems are configured to default to commands from the primary controller, but switches to the commands from the secondary controller for a predetermined length of time if the primary controller becomes fail-silent.

14 Claims, 4 Drawing Sheets

ASYMMETRIC SYSTEM ARCHITECTURE FOR FAIL-OPERATIONAL FUNCTIONS WITH LIMITED AVAILABILITY REQUIREMENTS

INTRODUCTION

The present disclosure relates to control system architectures, more particularly, to control system architectures having fail-operational functions.

Modern vehicles are known to have driver assistance systems for enhancing occupant comfort and vehicle performance. The driver assistance systems utilize vehicle system controllers designed to operate various vehicle systems, such as HVAC systems, infotainment systems, navigation systems, and drive control systems. The drive control systems include steering control, throttle control, and braking control to partially or fully automate the driving of the vehicle.

SAE International J3016 provides a common taxonomy and definitions for automated driving. SAE automated driving levels ranges from SAE Level 0, no automation, to SAE Level 5, full automation. For certain SAE automated driving levels such as SAE Level 2 and 3, conditional automation, there is an expectation that a human driver will respond appropriately to a request to intervene. Such a scenario may occur when the vehicle systems controller detects a fault and alerts the human driver to take manual control of the vehicle. The alert may be a visual alert such as a warning light in the instrument cluster, an audio alert such as a verbal warning broadcasted over the vehicle infotainment system, or a combination of both.

Vehicle systems controllers for vehicles designed for SAE Levels 2 and 3 of automation utilize fail-operational architectures to ensure that the vehicle continues to operate at least partially automated for a predetermined amount of time upon the detection of a fault. The predetermined amount of time should be the time required for a vehicle systems controller to alert the human driver of the fault and for the driver to take manual control of the vehicle.

An example of a vehicle systems controller having fail-operational architecture includes dual duplex controllers having identical hardware and software. If a fault is detected in the first controller, the first controller will fail-silent, meaning that the first controller will no longer send out commands and becomes silent. A secondary controller, also known as a back-up controller, will be activated and all vehicle systems controlled by the first controller will switch over to rely on instructions from the backup controller. The backup controller enables the overall vehicle systems controller to remain operational in a failure mode.

Another example of a vehicle systems controller having fail-operational architecture is a triple modular redundancy control system, which requires three substantially identical controllers that execute the same functions. A voter takes the results from all three controllers and selects the results that appears at least twice. Whether the fail-operational architectures utilize duplex controllers or triple modular redundancy control system, the normal operating controllers, also known as non-faulting controllers, will continue to operate, at least on a limited basis.

Such redundancies in hardware and software for control systems having duplex controllers or triple modular redundancies results in increased system complexity, vehicle weight, and cost inefficiencies. Thus, while current fail-operational architecture for driver assistance systems achieve their intended purpose, they typically also result in over-designed systems in terms of system resources such as CPU and memory. There is therefore a need for a new fail-operational architecture for a vehicle systems controller and a method to ensure that the vehicle systems controller continues to function for a predetermined amount of time to allow the human driver to respond once the driver is alerted of a fault in the vehicle systems controller.

SUMMARY

According to several aspects, a vehicle systems controller having an asymmetric system architecture is disclosed. The vehicle systems controller includes a primary controller having a memory unit containing a primary set of software applications and a processor configured to execute the primary set of software applications to generate primary command instructions, wherein the primary controller is configured to self-detect faults and fail-silent if a fault is detected; a secondary controller having a memory unit containing a secondary set of software applications and a processor configured to execute the secondary set of software applications to generate secondary command instructions; and a vehicle system having pre-identified vehicle functions, wherein the vehicle system is configured to simultaneously receive the primary and secondary command instructions while defaulting to the primary command instructions and switches to the secondary command instructions if the primary controller becomes fail-silent. The secondary set of software applications are a subset of the primary set of software applications and are employed for the continued operation of the pre-identified vehicle functions of the vehicle system.

In an additional aspect of the present disclosure, the vehicle systems controller is configured to generate an alert signal if the primary controller becomes fail-silent and shut down the operating secondary controller after the sooner of (i) receiving an input resulting from the alert signal or (ii) after a predetermined amount of time has lapsed from the time the primary controller becoming fail-silent.

In another aspect of the present disclosure, the secondary controller is configured to self-detect faults and fail-silent if a fault is detected. The vehicle systems controller is further configured to send an alert signal if the secondary controller fail-silent and shut down the operational primary controller after the sooner of (i) receiving an input resulting from the alert signal or (ii) after a predetermined amount of time has lapsed from the time the secondary controller becoming fail-silent.

In another aspect of the present disclosure, the vehicle systems controller is further configured to send an alert signal if both the primary and secondary controllers become fail-silent.

In another aspect of the present disclosure, the alert signal activates at least one of a visual alert and audio alert to alert the human driver of a vehicle systems controller fault and to instruct the human driver to take manual control of the vehicle.

In another aspect of the present disclosure, the memory unit of the primary controller includes a sub-set of software applications that generates an output that has an extended time value that is greater than the predetermined amount of time. The primary controller is configured to communicate the extended time value output to the secondary controller and the secondary controller is further configured to communicate the extended time value output to the vehicle system.

In another aspect of the present disclosure, the memory of the secondary controller system does not contain the sub-set of software applications that generates the extended time value output.

In another aspect of the present disclosure, one of the primary controller and secondary controller includes a dedicated fault detection module configured to detect errors.

In another aspect of the present disclosure, the storage capacity of the memory unit of the primary controller is greater than the storage capacity of the memory unit of the secondary controller. The processing capacity of the processor of the primary controller is greater than the processing capacity of the processor of the secondary controller.

According to several aspects, a vehicle systems controller is disclosed. The vehicle systems controller includes a memory unit containing a primary set of software applications and a processor configured to execute the primary set of software applications to generate primary command instructions, wherein the primary controller is configured to self-detect faults and fail-silent if a fault is detected; and a vehicle system having pre-identified vehicle functions, wherein the vehicle system is configured to receive the primary instructions and includes a memory unit containing a subset of the primary set of software applications for the operation of the pre-identified vehicle functions and a processor to execute the subset of software applications.

In another aspect of the present disclosure, the vehicle system is configured to detect when the primary controller becomes fail-silent and executes the subset of the primary set of software applications.

In another aspect of the present disclosure, the vehicle system is configured to generate an alert to notify a human driver of a fault and instruct the human driver to take manual control of the vehicle.

In another aspect of the present disclosure, the processor of the vehicle system cease executing the subset of the primary set of software applications after the sooner of (i) receiving an input resulting from the alert signal or (ii) after a predetermined amount of time has lapsed from the fail-silent of the secondary controller.

According to several aspects, a method of operating a vehicle systems controller having a fail-operational functions is disclosed. The method includes the steps of collecting data, by a plurality of external sensors, about the surrounding areas of a vehicle; simultaneously processing, by a primary and secondary controller, the collected data to generate a plurality of primary command instructions and a plurality of secondary command instructions, wherein the secondary command instructions include only command instructions that are pre-identified for the safe operation of the vehicle in at least partial autonomous mode; and receiving, by a vehicle system, both the primary and secondary command instructions, wherein the vehicle system defaults to the primary command instructions and switches to the secondary command instructions if the primary command becomes silent.

In another aspect of the present disclosure, the method further includes the steps of generating, by the primary controller, extended time value outputs and communicating the extended time value outputs to the secondary controller, and relaying, by the secondary controller, the extended time value outputs to the vehicle system.

In another aspect of the present disclosure, the method further includes the step of continuously performing a self-check for faults, by the primary controller. The primary controller is configured to fail-silent if a fault is detected in the primary controller.

In another aspect of the present disclosure, the method further includes the step of continuously performing a self-check for faults, by the secondary controller. The controller is configured to fail-silent if a fault is detected in the secondary controller.

In another aspect of the present disclosure, the method further includes the steps of generating an alert signal, by the vehicle systems controller, if one of the primary controller and secondary controller becomes fail-silent and shutting down the other of the primary and secondary controllers after a predetermined length of time.

In another aspect of the present disclosure, the method further includes the steps of activating an alert, by the alert signal, to notify a human driver to take manual control of the vehicle and shut down the other of the primary and secondary controllers after the sooner of (i) receiving a human input resulting from the alert signal or (ii) after the predetermined amount of time has lapsed.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
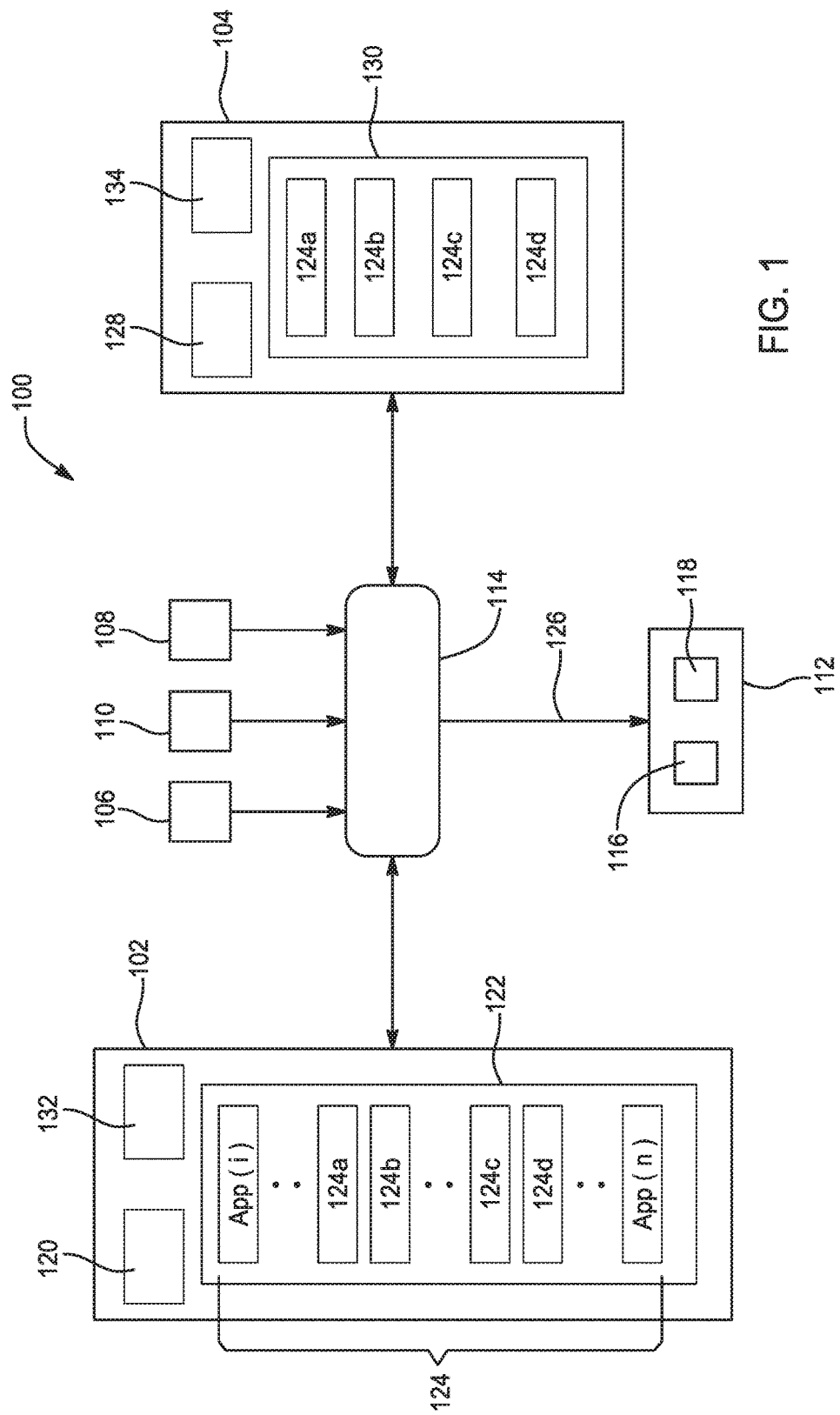
FIG. 1 is a functional diagram of a vehicle systems controller having a fail-operational architecture, according to a first exemplary embodiment.

Referring to the drawings, wherein like reference numbers correspond to like or similar components whenever possible throughout the several figures, FIG. 1 shows a functional diagram for a first exemplary embodiment of a vehicle systems controller 100 having a fail-operational architecture for a land-based motor vehicle (not shown) such as a passenger car, truck, sport utility vehicle, van, motor home, or any other type of land based vehicle. The vehicle systems controller 100 includes a primary controller 102 and a secondary controller 104, also known as a back-up controller 104, both of which are in communications with vehicle external sensors 106, vehicle state sensors 108, vehicle receivers 110, and various vehicle systems 112. The vehicle systems controller 100 utilizes a communication bus 114 or any other wired or wireless network for communicating between the controllers 102, 104 and the various vehicle sensors 106, 108, receivers 110, and various vehicle systems 112.

The vehicle external sensors 106 may include, but are not limited to, image capturing sensors, range sensors, and scanning lasers, for collecting information about the adjacent areas surrounding the motor vehicle. The vehicle state sensors 108 include, but are not limited to, velocity sensor, acceleration sensor, yaw sensor, pitch sensor, steering angle sensor, etc., for collecting information on the current state of the vehicle. The vehicle receivers 110 may also include a vehicle-to-everything (V2X) receiver for receiving at least one of vehicle-to-vehicle (V2V), vehicle-to-infrastructure (V2I), vehicle-to-pedestrian (V2P), vehicle-to-device (V2D), and vehicle-to-grid (V2G) communications. The V2X communications may contain information about surrounding areas beyond the detection ranges of the vehicle external sensors 106. The vehicle receivers 110 also include a global position satellites (GPS) receiver for receiving GPS signal from satellites for determining the location of the motor vehicle, and any other signals from a telematics module connected to, for example, a cellular network.

The primary and secondary controllers 102, 104 are configured to process information collected by the vehicle external sensor 106, vehicle state sensors 108, and vehicle receivers 110 for generating command instructions for the vehicle systems 112. The vehicle systems 112 include, but not limited to, navigation systems, steering control systems, throttle control systems, and braking control systems for partially or fully automating the driving of the vehicle. The instructions generated by the controllers include commands for the vehicle systems 112 to activate actuators (not shown) for controlling features and functions of the individual vehicle systems 112, including functions which are pre-identified for the safe operational of the vehicle under partial or full autonomous mode. The vehicle systems 112 include processors 116 and memory units 118, or microprocessors configured to execute the instructions received from the controllers 102, 104 to activate the actuators.

The vehicle systems controller 100 is configured with a fail-operational architecture, such that when a fault or error is detected in the primary or secondary controllers 102, 104, the pre-identified functions of the vehicle systems 112 will continue to operate for a predetermined length of time as the controller 102, 104 having the fault goes into fail-silent. The predetermined length of time should be sufficient in length to at least allow for the vehicle systems controller 100 or the vehicle systems 112 to generate an alert notifying the human driver of the failed controller 102, 104 and for a human driver (or remote operator) to react by taking manual control of the motor vehicle. The vehicle system controller 100 then shuts down after the sooner of (i) the human driver takes manual control of the motor vehicle or (ii) after the predetermined amount of time has lapsed. In other words, the vehicle systems controller 100 becomes fail-operational for pre-identified functions for a limited amount of time after a fault is detected and then becomes fail-silent thereafter. Pre-identified functions include, but are not limited to, forward object detecting, lane centering, steering control, braking control, and throttle control. These exemplary pre-identified functions should remain operational for the safe operation of the motor vehicle in at least partial autonomous mode.

In a failure mode, the operation of the system is limited to a subset of functions—for example, the subset could for some systems mean that the system is able to keep the vehicle in the current lane and reacting to static and dynamic objects in the front of the vehicle, while the full set of functions executing in normal mode (i.e., when there are no failures) could involve more functionality such as automatic lane changes and surround vehicle object detection and reaction, in the operational domain of a Level 2 or 3 system.

The primary controller 102 includes a primary processor 120 and primary memory unit 122. The primary memory unit 122 includes data and a plurality of software applications $App_{(i)}$ to $App_{(n)}$ (referred to generally as software applications 124) for the normal operation of the motor vehicle. The primary processor 120 receives information collected from various sensors/receivers 106, 108, 110 and execute the software applications 124 to generate instructions 126, also known as commands 126 or command instructions 126, for the various vehicle systems 112. The software applications 124 include general vehicle operational software, such as automatic cabin climate control, radio volume control, rear collision warning, etc.

However, the overall software applications $App_{(i)}$ to $App_{(n)}$, software applications 124, also include pre-identified vehicle operational software (shown as 124a, 124b, 124c, and 124d) for controlling pre-identified functions of the various vehicle systems for enabling the vehicle to safely operate in at least partially autonomous mode. Examples of such pre-identified software 124a, 124b, 124c, and 124d may include steering control applications 124a, throttling control applications 124b, braking control applications 124c, and predicted vehicle trajectory applications 124d. In other words, the pre-identified vehicle operational software 124a, 124b, 124c, and 124d is a sub-set of the total software applications $App_{(i)}$ to $App_{(n)}$ stored in the primary memory unit 122 of the primary controller 102. It should be appreciated that the examples of pre-identified vehicle functions for the safe operation of the vehicle are provided for explanatory purposes only. The actual pre-identified vehicle functions are dependent on the type of vehicle and are vehicle specific. This subset also depends on the level of automation and the operational design domain of the automation system (using terminology defined in SAE International J3016). It should also be appreciated that the actual total number of software applications $App_{(i)}$ to $App_{(n)}$ can be in the hundreds or thousands, and the actual number of which are pre-identified software applications may be only a small percentage of the total.

The secondary controller 104 includes a secondary processor 128 and secondary memory unit 130. The secondary memory unit 130 includes data and pre-identified operation software 124a, 124b, 124c, and 124d, which are identical to the pre-identified operational software 124a, 124b, 124c, and 124d of the primary controller 102. The secondary processor 128 receives information collected from various sensors/receivers 106, 108, 110 and executes the pre-identified operation software applications 124a, 124b, 124c, and 124d to generate command instructions 126 for the vehicle systems 112 for operating the pre-identified functions for the safe operation of the vehicle in at least partial autonomous mode.

The amount of data and software applications stored in the secondary memory unit 130 for executing pre-identified vehicle functions is very small in comparison to the overall software applications $App_{(i)}$ to $App_{(n)}$ stored in the primary memory unit 122, because the secondary memory unit 130 only contains pre-identified software applications 124a, 124b, 124c, 124d that are preferred for the safe operation of the vehicle in at least partial automated mode. The pre-identified software applications 124a, 124b, 124c, 124d is only a small subset of the total software applications $App_{(i)}$ to $App_{(n)}$ incorporated in the primary controller 102. Since the pre-identified operational software 124a, 124b, 124c, 124d is only a subset of the overall operational software applications $App_{(i)}$ to $App_{(n)}$ of the primary controller, a lessor capacity secondary processor 128 and memory unit 130 may be utilized in the secondary controller 104 as compared to the primary controller 102.

Both the primary and secondary processors 120, 128 are configured to monitor the operations of the respective controller 102, 104 to detect a fault or erroneous state in the respective controllers 102, 104. Alternatively, the primary and secondary controllers 102, 104 may each include a dedicated fault detector module 132, 134 for monitoring the operations of the respective controllers 102, 104 in lieu of relying on the respective processors 120, 128. If a fault or error is detected in one of the primary and secondary controllers 102, 104, the controller 102, 104 having the fault enters a fail-silent mode by ceasing to process signals from the vehicle sensors/receivers 106, 108 110, and therefore no longer generating instructions 126 to be transmitted to the vehicle systems 112. The non-faulting, normal operating, controller 102, 104 sends an alert to the human driver of the vehicle, continues to process input from the various vehicle sensors/receivers 106, 108, 110, and continues to generate commands 126 to operate the pre-identified vehicle systems until the sooner of a predetermined length of time have lapsed or the human driver takes manual control. The non-faulting controller 102, 104 enables the vehicle systems controller 100 to operate in a fail-operational mode for limited pre-identified functions and time.

The vehicle systems 112 receive instructions simultaneously from both the primary and secondary controllers 102, 104, but normally defaults to instructions from the primary controller 102. If an error or fault is detected in the primary controller 102, then the primary controller 102 will become fail-silent and an alert generated. The alert may be a visual alert such as a warning light in the instrument cluster, a message on a display monitor in the dash, or a notification on a heads-up display to notify the human driver of the fault in the vehicle systems controller 100. The alert may also be an audio alert such as a warning chime or a verbal warning broadcasted over the vehicle infotainment system. The alert may also be a combination of a visual and audio alert, or haptic alert (e.g., seat vibrations). The vehicle systems 112 will switch to the commands from the secondary controller 104, which will continue to function until the sooner of a predetermined amount of time has lapsed or when the human driver takes manual control of the vehicle. The vehicle systems controller 100 may detect that the human driver has taken manual control by having the human driver actuate a button or touch screen to acknowledge the alarm and/or detect an input such as a movement of steering wheel, brake pedal, or gas pedal by the human driver. After such time, the secondary controller 104 will shut down and the vehicle defaults into full manual mode.

If an error or fault is detected in the secondary controller 104, the secondary controller 104 will become fail-silent and an alert will be issued to the human driver. The pre-identified vehicle systems 112 will continue to default to the commands 126 from the primary controller 102, which will continue to function until the sooner of a predetermined of time has lapsed or when the human driver takes manual control of the vehicle. After such time, the primary controller 102 will shut down and the vehicle defaults into full manual mode. Upon the secondary controller becoming fail-silent, the primary controller may choose to implement only the pre-identified software applications 124a, 124b, 124c, 124d to free up processor power for other applications if needed.

As long as the vehicle system controller 100 is operating in a normal operation mode with no errors, the primary controller 102 maintains control of the vehicle systems 112. The secondary controller 104 is only enabled when the primary controller 102 produces errors in the vehicle system controller 100. As a result, the secondary controller 104 only requires the minimum amount of software required to maintain limited operation for those respective pre-identified functions that are deemed preferable to operate the features of the vehicle systems 112.

In addition, certain pre-identified functions with outputs that are valid for an extended period of time, beyond the pre-determined time, may communicate their outputs to the secondary controller periodically in normal, fault-free operation; thus, avoiding replication of such functions on the secondary controller. An example of such a function is a trajectory planner function that periodically generates the short-term trajectory for a lane centering and adaptive cruise control function to follow (i.e., the reference path for the longitudinal and lateral control functions). This reference path is valid for a duration that exceeds the predetermined time, which would be in the order of multiple seconds. The trajectory planner would not be replicated and instead send its output (the reference path) to the secondary controller, whereas the longitudinal and lateral control functions would be replicated on the secondary controller, thus being part of the subset of functions replicated on the secondary controller.

Therefore, instead of replicating on the backup controller functions that produce results valid for more than the predetermined amount of time, the primary controller communicates these outputs to the backup controller in normal operation. In case of primary controller failure, the backup controller uses the last known communicated outputs, possibly with error corrections of the outputs, in its execution of the subset of functions. This limits the amount of system resources required in the backup controller.

Figure 2:
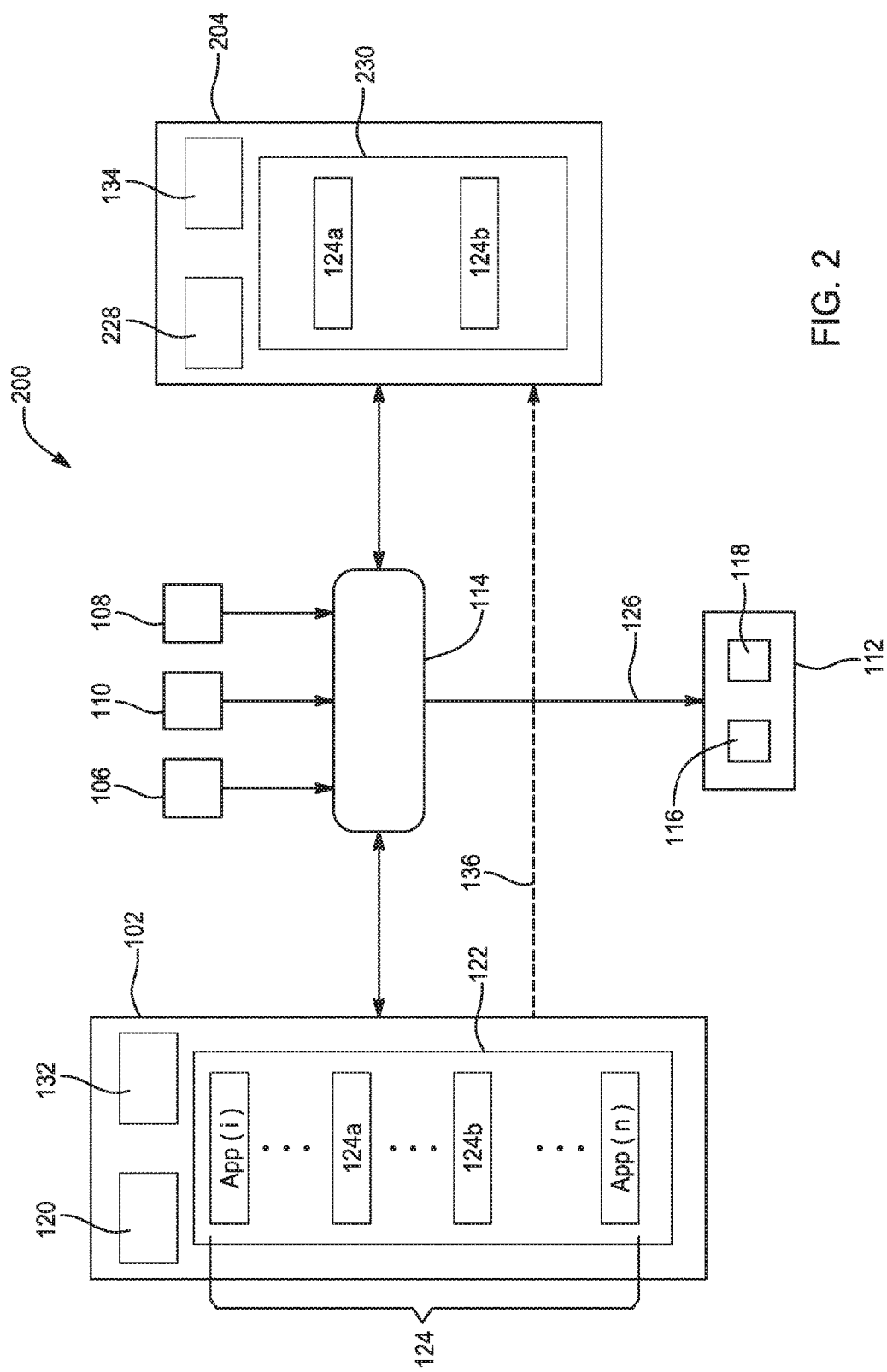
FIG. 2 is a functional diagram of a vehicle systems controller having a fail-functional architecture, according to a second exemplary embodiment.

FIG. 2 shows a second embodiment of a vehicle systems controller 200. This embodiment of the vehicle system controller 200 includes a secondary controller 204 having a secondary memory unit 230 that contains less software application 124d, 124h than what is preferred for the safe operation of the vehicle. Similar to the vehicle systems controller 100 shown in FIG. 1, the primary controller 102 includes both general and pre-identified software applications $App_{(i)}$ to $App_{(n)}$. At least one or more 124a, 124b of the pre-identified software applications 124a, 124b, 124c, 124d in the primary controller 102 generates an extended time value output 136 that is viable for a length of time greater than the predetermined amount of time. In other words, the extended time value output 136 of a pre-identified software application has an extended time value that is greater than the predetermined amount of time. The secondary controller memory unit 230 includes the pre-identified software applications for the safe operation of the vehicle, except for the pre-identified software applications 124c, 124d that generate the extended time value output 136. Examples of an extended time value output 136 are projected trajectory of the vehicle, lane prediction, vehicle position, etc.

The extended time value outputs 136 are generated by the software application 124c, 124d in the primary controller 102 and communicated to the secondary controller 104. In the event of the primary controller 102 failing silent, the vehicle systems 112 will switch to the commands from the secondary controller 204, which will relay the last extended time value outputs 136 generated by the primary controller to the vehicle systems 112 while also executing the pre-identified software applications 124a, 124b stored in its memory unit 230. The secondary controller 204 will continue to function until the sooner of a predetermined amount of time has lapsed or when the human driver takes manual control of the vehicle. In the event of the secondary controller 204 failing silent, the pre-identified vehicle systems 112 will continue to default to the commands 126 from the primary controller 102 as in the first embodiment of the vehicle system controller 100.

The benefit of the secondary controller 204 having less pre-identified operating software 124c, 12d is that the processor 228 and memory unit 230 may be scaled down because of the lack of need to store and process this additional software. If the primary controller 102 fails, the secondary controller 104 retains the last extended time value output 136 communicated to it by the primary controller 102 and this extended time value output 136 need not be updated again because the secondary controller 204 will shut down the sooner of the predetermined amount of time has lapsed or when the human driver takes manual control.

Figure 3:
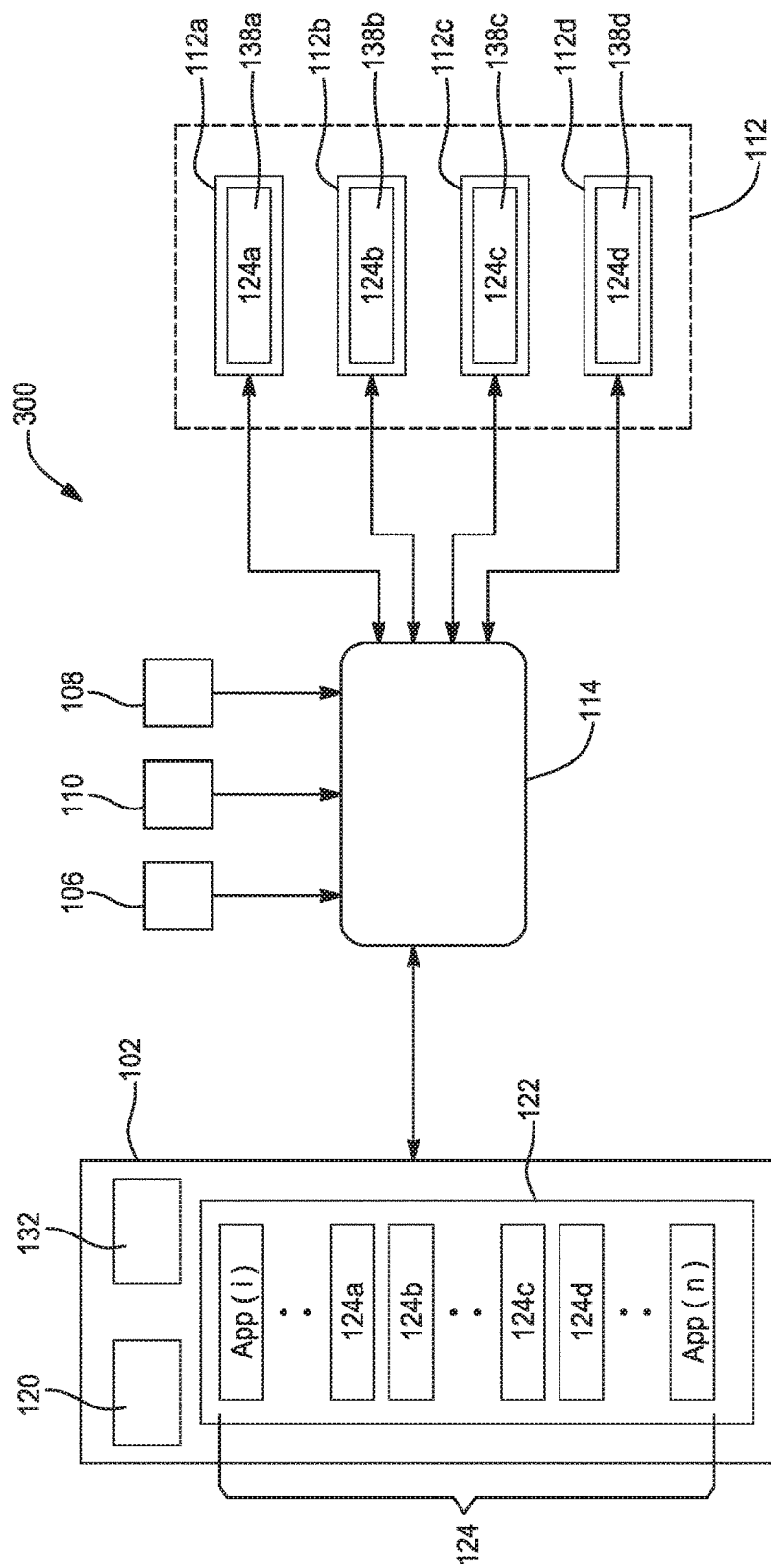
FIG. 3 is a functional diagram of a vehicle systems controller having a fail-functional architecture, according to a third exemplary embodiment.

FIG. 3 shows yet another embodiment of the vehicle systems controller 300. Similar to the embodiment shown in FIGS. 1 and 2, the primary controller 102 includes both general and pre-identified software applications $App_{(i)}$ to $App_{(n)}$ for the various vehicle systems 112a, 112b, 112c, 112d, shown generally as 112. However, there is no dedicated secondary or back-up controller 104, 204 present. Instead, the pre-identified software applications 124, are distributed to local processors 138a, 138b, 138c, 138d or micro-controllers 138a, 138b, 138c, 138d in the various vehicle systems 112. For example, the pre-identified software application 124a that generates steering commands are incorporated into the local controller of the steering control system and the pre-identified software application 124c that generate braking control are incorporated in the local controller of the braking system.

If a fault is detected in the primary controller 102, the primary controller becomes fail-silent. One or more of the local processors 138a, 138b, 138c, 138d or micro-controllers 138a, 138b, 138c, 138d for the various vehicle systems generates a warning to the human driver and process the applicable sensor information to continue operating the pre-identified system for the sooner of the predetermined amount of time or until human takes over.

The processors 120, 128 of the primary controller 102 and secondary controller 104, and the local processors 138a, 138b, 138c, 138d may be any conventional processor, such as commercially available CPUs, a dedicated ASIC, or other hardware-based processor. The memory units 122, 130, 230 of the primary controller 102 and secondary controller 104, 204, may be any computing device readable medium such as hard-drives, solid state memory, ROM, RAM, DVD or any other medium that is capable of storing information that is accessible to the processors. It should be appreciated that each of the primary and secondary controllers 102, 104, 204 may include more than one processor and memory unit, and the plurality of processors and memory units do not necessary have to be housed within the respective housings of the primary and secondary controllers.

Figure 4:
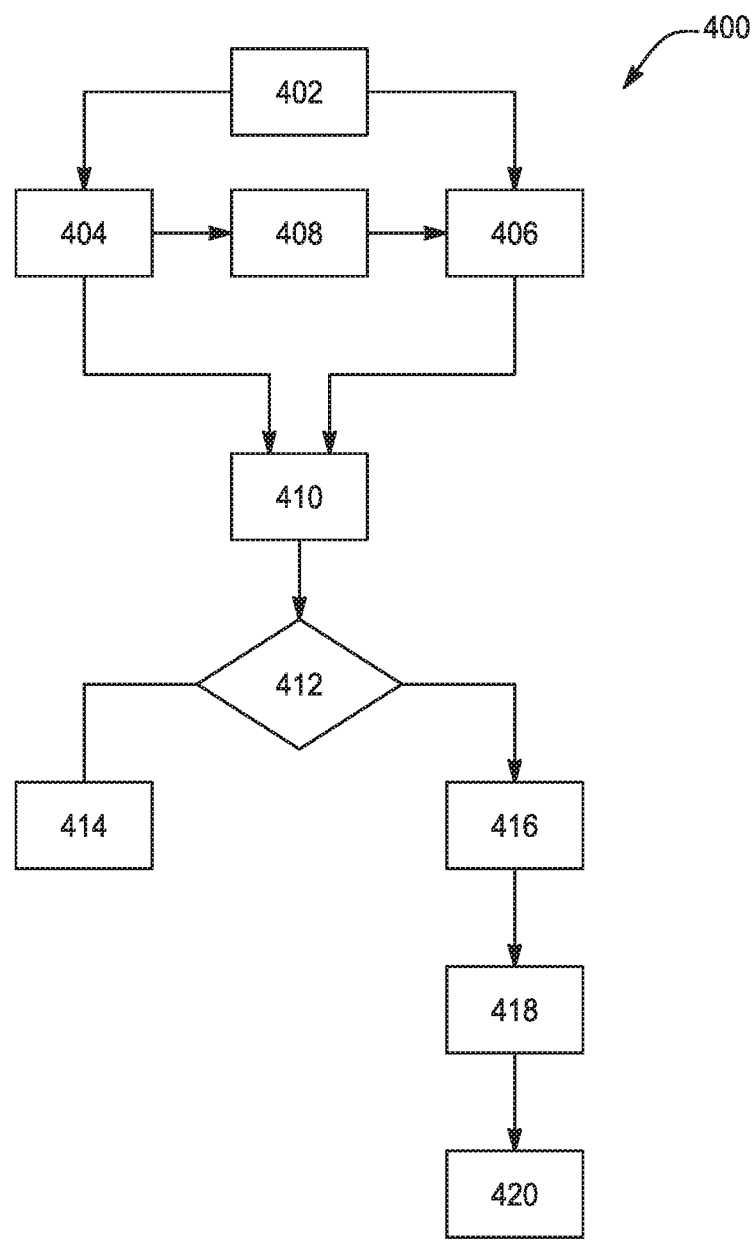
FIG. 4 is a method of operating a vehicle systems controller having a fail-operational functions.

Shown in FIG. 4 is a method of operating a vehicle systems controller having fail-operational functions 400. In block 402, the vehicle systems controller receives information from a plurality of vehicle sensors/receivers.

In block 404, a primary controller processes the information from the various sensors/receivers to generate commands to operate both general and pre-identified vehicle systems, while checking for errors and faults in the primary controller. In block 406, simultaneously, a secondary controller processes the information from the various sensors/receivers to generate commands to operate only selected pre-identified vehicle systems, while checking for errors and faults in the secondary controller. In block 408, the primary controller communicates extended time value outputs to the secondary controller.

In block 410, the vehicle systems receive commands from both the primary and secondary controllers, and defaults to the commands from the primary controller. In block 412, the vehicle systems determine if there is a fault in the primary or secondary controller. In block 414, if no fault is detected in either of the primary or secondary controllers, the vehicle systems continues to default to the commands from the primary controller.

In block 416, if a fault is detected is detected in either of the primary or secondary controllers, the faulting controller becomes fail-silent and the vehicle systems defaults to the commands of the non-faulting controller. In block 418, an alert is generated and issued to the human driver of a fault in the system.

In block 420, the non-faulting controller will continue to generate commands only until the sooner of a predetermined amount of time has lapsed or the human driver takes control, after which the non-faulting controller shuts down.

The above embodiments of a vehicle system controller 100, 200, 300 having a fail-operational architecture as described herein is for an on-land motor vehicle. It should be appreciated that the fail-operational architecture can apply to other types of vehicles, such as water vehicles, air vehicles, space vehicles, and other types of vehicles that utilize vehicle systems controllers for enhancing the operation of the vehicles.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A vehicle systems controller having an asymmetric system architecture, comprising:

a primary controller having a memory unit containing a primary set of software applications and a processor configured to execute the primary set of software applications to generate primary command instructions, wherein the primary controller is configured to self-detect faults and fail-silent if a fault is detected;

a secondary controller having a memory unit containing a secondary set of software applications and a processor configured to execute the secondary set of software applications to generate secondary command instructions; and a vehicle system having pre-identified vehicle functions, wherein the vehicle system is configured to simultaneously receive the primary and secondary command instructions while defaulting to the primary command instructions and switching to the secondary command instructions if the primary controller becomes fail-silent, wherein the secondary set of software applications are a subset of the primary set of software applications and are employed for the continued operation of the pre-identified vehicle functions of the vehicle system;

wherein the vehicle systems controller is configured to generate an alert signal if the primary controller becomes fail-silent and shut down the operating secondary controller after the sooner of (i) receiving an input resulting from the alert signal and (ii) after a predetermined amount of time has lapsed from the time the primary controller becoming fail-silent, wherein the secondary controller is configured to self-detect faults and fail-silent if a fault is detected, and wherein the vehicle systems controller is further configured to send an alert signal if the secondary controller fail-silent and shut down the operational primary controller after the sooner of (i) receiving an input resulting from the alert signal and (ii) after a predetermined amount of time has lapsed from the time the secondary controller becoming fail-silent, wherein the vehicle systems controller is further configured to send an alert signal if both the primary and secondary controllers become fail-silent, wherein the alert signal activates at least one of a visual alert and audio alert to alert the human driver of a vehicle systems controller fault and to instruct the human driver to take manual control of the vehicle, and wherein the memory unit of the primary controller includes a sub-set of software applications that generates an output that has an extended time value that is greater than the predetermined amount of time, and the primary controller is configured to communicate the extended time value output to the secondary controller, and the secondary controller is further configured to communicate the extended time value output to the vehicle system.

2. The system of claim 1 wherein the memory of the secondary controller system does not contain the sub-set of software applications that generates the extended time value output.

3. The system of claim 2, wherein one of the primary controller and secondary controller includes a dedicated fault detection module configured to detect errors.

4. The system of claim 3, wherein the storage capacity of the memory unit of the primary controller is greater than the storage capacity of the memory unit of the secondary controller.

5. The system of claim 3, wherein the processing capacity of the processor of the primary controller is greater than the processing capacity of the processor of the secondary controller.

6. A vehicle systems controller, comprising:
a primary controller having a memory unit containing a primary set of software applications and a processor configured to execute the primary set of software applications to generate primary command instructions, wherein the primary controller is configured to self-detect faults and fail-silent if a fault is detected; and
a vehicle system having pre-identified vehicle functions, wherein the vehicle system is configured to receive the primary instructions, and includes a memory unit containing a subset of the primary set of software applications for the operation of the pre-identified vehicle functions and a processor to execute the subset of software applications;
wherein the primary controller is configured to generate an extended time value output and to communicate the extended time value output to the vehicle system.

7. The vehicle system of claim 6, wherein the vehicle system is configured to detect when the primary controller becomes fail-silent, and executes the subset of the primary set of software applications.

8. The vehicle system of claim 7, wherein the vehicle system is configured to generate an alert to notify a human driver of a fault and instruct the human driver to take manual control of the vehicle.

9. The vehicle system of claim 8, wherein the processor of the vehicle system cease executing the subset of the primary set of software applications after the sooner of (i) receiving an input resulting from the alert signal and (ii) after a predetermined amount of time has lapsed from the fail-silent of the secondary controller.

10. A method of operating a vehicle systems controller having a fail-operational functions, comprising the steps of:
collecting data, by a plurality of external sensors, about the surrounding areas of a vehicle;
simultaneously processing, by a primary and secondary controller, the collected data to generate a plurality of primary command instructions and a plurality of secondary command instructions, wherein the secondary command instructions include only command instructions that are pre-identified for the safe operation of the vehicle in at least partial autonomous mode;
receiving, by a vehicle system, both the primary and secondary command instructions, wherein the vehicle system defaults to the primary command instructions and switches to the secondary command instructions if the primary command becomes silent; and
generating, by the primary controller, extended time value outputs and communicating the extended time value outputs to the secondary controller; and
relaying, by the secondary controller, the extended time value outputs to the vehicle system.

11. The method of claim 10, further comprising the step of continuously performing a self-check for faults, by the primary controller, wherein the primary controller is configured to fail-silent if a fault is detected in the primary controller.

12. The method of claim 11, further comprising the step of continuously performing a self-check for faults, by the secondary controller, wherein the secondary controller is configured to fail-silent if a fault is detected in the secondary controller.

13. The method of claim 12, further comprising the steps of:
generating an alert signal, by the vehicle systems controller, if one of the primary controller and secondary controller becomes fail-silent; and
shutting down the other of the primary and secondary controllers after a predetermined length of time.

14. The method of claim 13, further comprising the steps of:
activating an alert, by the alert signal, to notify a human driver to take manual control of the vehicle; and
shut down the other of the primary and secondary controllers after the sooner of (i) receiving a human input resulting from the alert signal and (ii) after the predetermined amount of time has lapsed.

* * * * *